O. J. PARKS.
TANK CAR.
APPLICATION FILED JAN. 24, 1920.
1,338,392.
Patented Apr. 27, 1920.
2 SHEETS—SHEET 1.
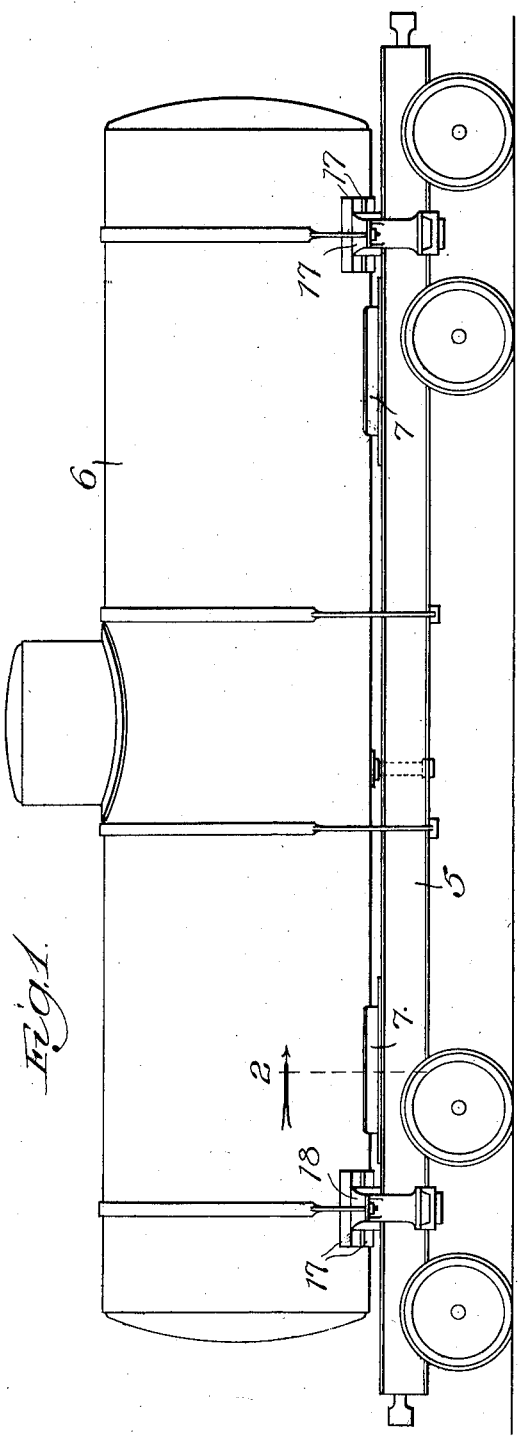
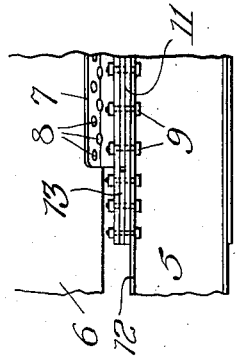
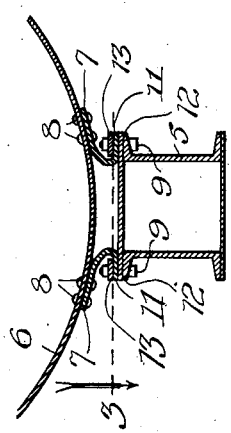
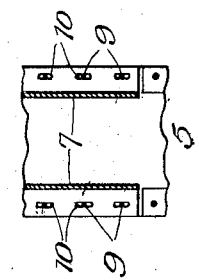
Inventor.
Ostrander J. Parks, O. J. PARKS.
TANK CAR.
APPLICATION FILED JAN. 24, 1920.
1,338,392.
Patented Apr. 27, 1920.
2 SHEETS—SHEET 2.
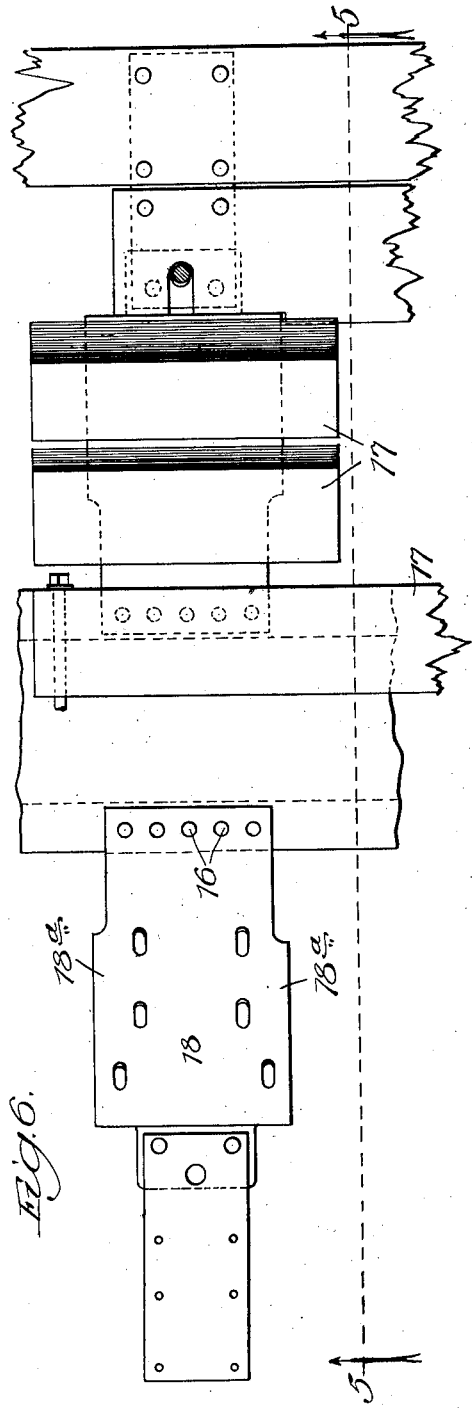
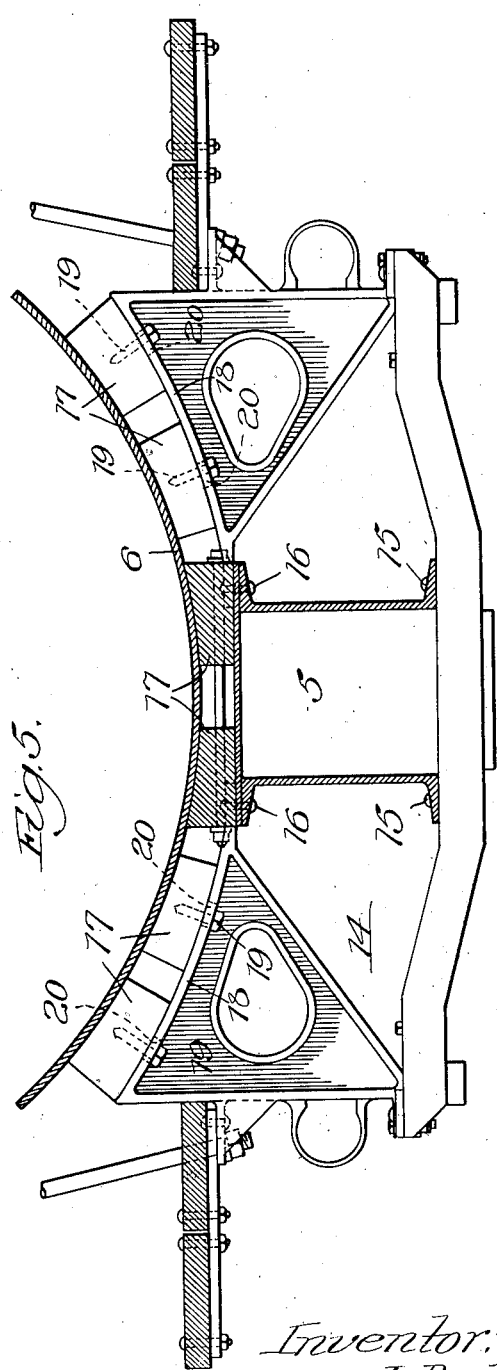
Inventor:
Ostrander J. Parks,

UNITED STATES PATENT OFFICE.

OSTRANDER J. PARKS, OF RIVER FOREST, ILLINOIS, ASSIGNOR TO GENERAL AMERICAN TANK CAR CORPORATION, OF CHICAGO, ILLINOIS, A CORPORATION OF ILLINOIS.

TANK-CAR.

1,338,392.  Specification of Letters Patent.  Patented Apr. 27, 1920.

Application filed January 24, 1920. Serial No. 353,690.

*To all whom it may concern:*

Be it known that I, OSTRANDER J. PARKS, a citizen of the United States, residing at River Forest, in the county of Cook and State of Illinois, have invented a new and useful Improvement in Tank-Cars, of which the following is a specification.

My invention relates, more particularly, to tank cars of the type in which there is interposed between the under frame of the car and the tank proper, filler members, usually of wood, the under frames referred to usually being provided with bolsters which present curved upper surfaces described on a greater radius than the circular wall of the tank, thereby providing between the tank and bolster structure, outwardly flaring spaces in which the filler members, usually extending lengthwise of the car, and of wedge shape, to fit in the spaces provided, extend.

As structures of this general type have heretofore been constructed the wear or unequal shrinking of the various filler members presents the disadvantage of impairing the desired support of the tank on these filler members; and it is my primary object to provide a tank car wherein the filler members will be automatically adjustable to compensate for wear and unequal shrinkage and maintain the desired support for the tank, and where the car is of a type wherein the tank is anchored to the under frame in such a way that the receding of the filler members would throw undesirable stresses on the anchorage means, to prevent the exertion of such stresses on the anchoring means.

Referring to the accompanying drawings:—Figure 1 is a view in side elevation of a tank car in connection with which I have chosen to illustrate my invention. Fig. 2 is an enlarged section taken at the line 2 on Fig. 1 and viewed in the direction of the arrow. Fig. 3 is a section taken at the line 3 on Fig. 2 and viewed in the direction of the arrow. Fig. 4 is a broken view in side elevation of the structure shown in Fig. 2. Fig. 5 is a cross-sectional view of the tank car, the section being taken at the line 5—5 on Fig. 6 and viewed in the direction of the arrows; and Fig. 6, a broken plan view of a portion of the under frame of the car with certain parts broken away and showing certain of the filler members in place.

Referring to the particular construction of car shown in the drawings, the center sill of the car is represented at 5, and the tank at 6. The tank 6 is provided toward its opposite ends with anchoring means shown as formed of plates 7 extending, at opposite sides of the center sill 5 and fitting against the under side of the tank 6 and secured thereto as by the rivets 8. The lower ends of the plates 7 which are outwardly turned, as shown, bear against the upper member of the sill 5 and are secured thereto as by the bolts 9. The bolts 9 extend through elongated slots 10 in the flanged portions 11 of the plates 7, and also through openings in the flanged portions 12 of the sill and bars 13 superposed on the flanges 11. The structure thus provided while operating to anchor the tank 6 on the under frame, permits of relative lengthwise movement of these parts under expansion and contraction of the structure.

The sill 5 toward opposite ends of the car, and in the arrangement shown beyond the anchorage means just described, is provided with bolsters 14 secured, as by the rivets 15 and 16, to the upper and lower portions of the sill 5. The bolsters may be of any suitable construction, the arrangement of the parts being such that a space is provided between the bottom of the tank 6 and the under frame at the bolster portions 14, in which space filler blocks of any desirable number, shown as six in number in the particular arrangement illustrated, and represented at 17, are located, these filler blocks extending lengthwise of the car. The two filler blocks 17 nearest the median line of the car, are supported directly on the sill 5, the remaining ones of these filler blocks being supported on the saddle-portions 18 of the bolsters, the spaces between the bottom of the tank 6 and the saddle portions 18 being outwardly flaring, and the filler members located within the spaces as stated being of wedge shape as shown.

The filler members 17 are held in place by lag-screws represented at 19 which extend through elongated slots 20 in the outwardly-projecting flanges 18ª of the saddle-portions 18 and screw into the blocks 17.

The function of the filler blocks 17 is to form primary support for the tank, relieving the anchorage means, where provided, of stresses which would be detrimental to the structure. To this end the screws 19 are so adjusted as not to rigidly clamp the filler members 17 to the saddles 18, thereby to permit the filler members 17, to automatically slide down the saddle-surfaces 18 in the event of wear or unequal shrinkage of the filler-members to compensate for such wear or shrinkage, these filler members working down along these surfaces under such conditions, by the vibration of the car in moving along a track, and being guided, by the screws, to maintain them in a position in which they extend lengthwise of the car.

While I have illustrated and described a particular construction embodying my invention I do not wish to be understood as intending to limit it thereto as the same may be variously modified and altered without departing from the spirit of my invention.

What I claim as new and desire to secure by Letters Patent is:

1. In tank car construction, the combination of a frame, a tank extending longitudinally thereof, and filler members interposed between said tank and frame and on which said tank bears, said filler members being automatically shiftable on said frame to compensate for reduction in the thickness of said members and maintain a seating surface for the tank.

2. In tank car construction, the combination of a frame, a tank extending longitudinally thereof, filler members interposed between said tank and frame and on which said tank bears, said filler members being automatically shiftable on said frame to compensate for reduction in the thickness of said members and maintain a seating surface for the tank, and means guiding said filler members on said frame.

3. In tank car construction the combination of a frame formed with saddle-portions presenting outwardly and upwardly inclined surfaces, a tank extending longitudinally of said frame and in spaced relation thereto, with the spaces between said saddle-portions and tank outwardly flaring, and filler members in said spaces and on which said tank bears, said filler members being automatically shiftable on said frame to compensate for reduction in the thickness of said members and maintain a seating surface for the tank.

4. In tank car construction the combination of a frame formed with saddle-portions presenting outwardly and upwardly inclined surfaces, a tank extending longitudinally of said frame and in spaced relation thereto, with the spaces between said saddle-portions and tank outwardly flaring, and filler members of wedge shape in said spaces and on which said tank bears, said filler members being automatically shiftable on said frame to compensate for reduction in the thickness of said members and maintain a seating surface for the tank.

5. In tank car construction the combination of a frame formed with saddle-portions presenting outwardly and upwardly inclined surfaces, a tank extending longitudinally of said frame and in spaced relation thereto, with the spaces between said saddle-portions and tank outwardly flaring, filler members in said spaces and on which said tank bears, said filler members being automatically shiftable on said frame to compensate for reduction in the thickness of said members and maintain a seating surface for the tank, and means guiding said filler members on said frame.

6. In tank car construction, the combination of a frame, a tank extending longitudinally thereof, filler members interposed between said tank and frame and on which said tank bears, said filler members being automatically shiftable on said frame to compensate for reduction in the thickness of said members and maintain a seating surface for the tank, said frame containing slots, and means on said filler members and extending into said slots for guiding said filler members on said frame.

7. In tank car construction, the combination of a frame, a tank extending longitudinally thereof, filler members interposed between said tank and frame and on which said tank bears, said filler members being automatically shiftable on said frame to compensate for reduction in the thickness of said members and maintain a seating surface for the tank, said frame containing slots, and screws on said filler members and extending into said slots for guiding said filler members on said frame.

8. In tank car construction the combination of a frame formed with saddle-portions presenting outwardly and upwardly inclined surfaces, a tank extending longitudinally of said frame and in spaced relation thereto, with the spaces between said saddle-portions and tank outwardly flaring, filler members in said space and on which said tank bears, said filler members being automatically shiftable on said frame to compensate for reduction in the thickness of said members and maintain a seating surface for the tank, said saddle-portions containing slots, and means on said filler members and extending into said slots for guiding said filler members on said frame.

9. In tank car construction the combination of a frame, a tank extending longitudinally thereof, means anchoring said tank to said frame, and filler members interposed between said tank and frame and on which said tank bears, said filler members being automatically shiftable on said frame to compensate for reduction in the thickness of said members and maintain a seating surface for the tank.

10. In tank car construction the combination of a frame, a tank extending longitudinally thereof, means anchoring said tank to said frame, filler members interposed between said tank and frame and on which said tank bears, said filler members being automatically shiftable on said frame to compensate for reduction in the thickness of said members and maintain a seating surface for the tank, and means guiding said filler members on said frame.

11. In tank car construction, the combination of a frame formed with saddle portions presenting outwardly and upwardly inclined surfaces, a tank extending longitudinally of said frame, means anchoring said tank to said frame, said tank being spaced from said saddle portions, with the surfaces thus afforded flaring outwardly, and filler members in said spaces and on which said tank bears, said filler members being automatically shiftable on said frame to compensate for reduction in the thickness of said members and maintain a seating surface for the tank.

12. In tank car construction, the combination of a frame formed with saddle portions presenting outwardly and upwardly inclined surfaces, a tank extending longitudinally of said frame, means anchoring said tank to said frame, said tank being spaced from said saddle portions, with the surfaces thus afforded flaring outwardly, and filler members of wedge shape in said spaces and on which said tank bears, said filler members being automatically shiftable on said frame to compensate for reduction in the thickness of said members and maintain a seating surface for the tank.

13. In tank car construction, the combination of a frame formed with saddle portions presenting outwardly and upwardly inclined surfaces, a tank extending longitudinally of said frame, means anchoring said tank to said frame, said tank being spaced from said saddle portions, with the surfaces thus afforded flaring outwardly, filler members in said spaces and on which said tank bears, said filler members being automatically shiftable on said frame to compensate for reduction in the thickness of said members and maintain a seating surface for the tank, and means guiding said filler members on said frame.

14. In tank car construction, the combination of a frame, a tank extending longitudinally thereof, means anchoring said tank to said frame, filler members interposed between said tank and frame and on which said tank bears, said filler members being automatically shiftable on said frame to compensate for reduction in the thickness of said members and maintain a seating surface for the tank, said frame containing slots, and means on said filler members and extending into said slots for guiding said filler members on said frame.

15. In tank car construction, the combination of a frame, a tank extending longitudinally thereof, means anchoring said tank to said frame, said frame being formed toward its opposite ends with flanged saddle-portions presenting outwardly and upwardly inclined surfaces, said tank extending in spaced relation to said saddle-portions, with the spaces therebetween outwardly flaring, the flanged portions of said saddle-portions containing elongated slots, filler members located in said spaces and supported on said saddle-portions, said filler members being of wedge shape, and lag-screws in said filler members and extending downwardly through said slots and serving as guides for said filler members, in their automatic movement to adjusted position.

OSTRANDER J. PARKS.